Jan. 17, 1950 W. HUPPERT 2,495,103
ANCHORING DEVICE
Filed May 23, 1945
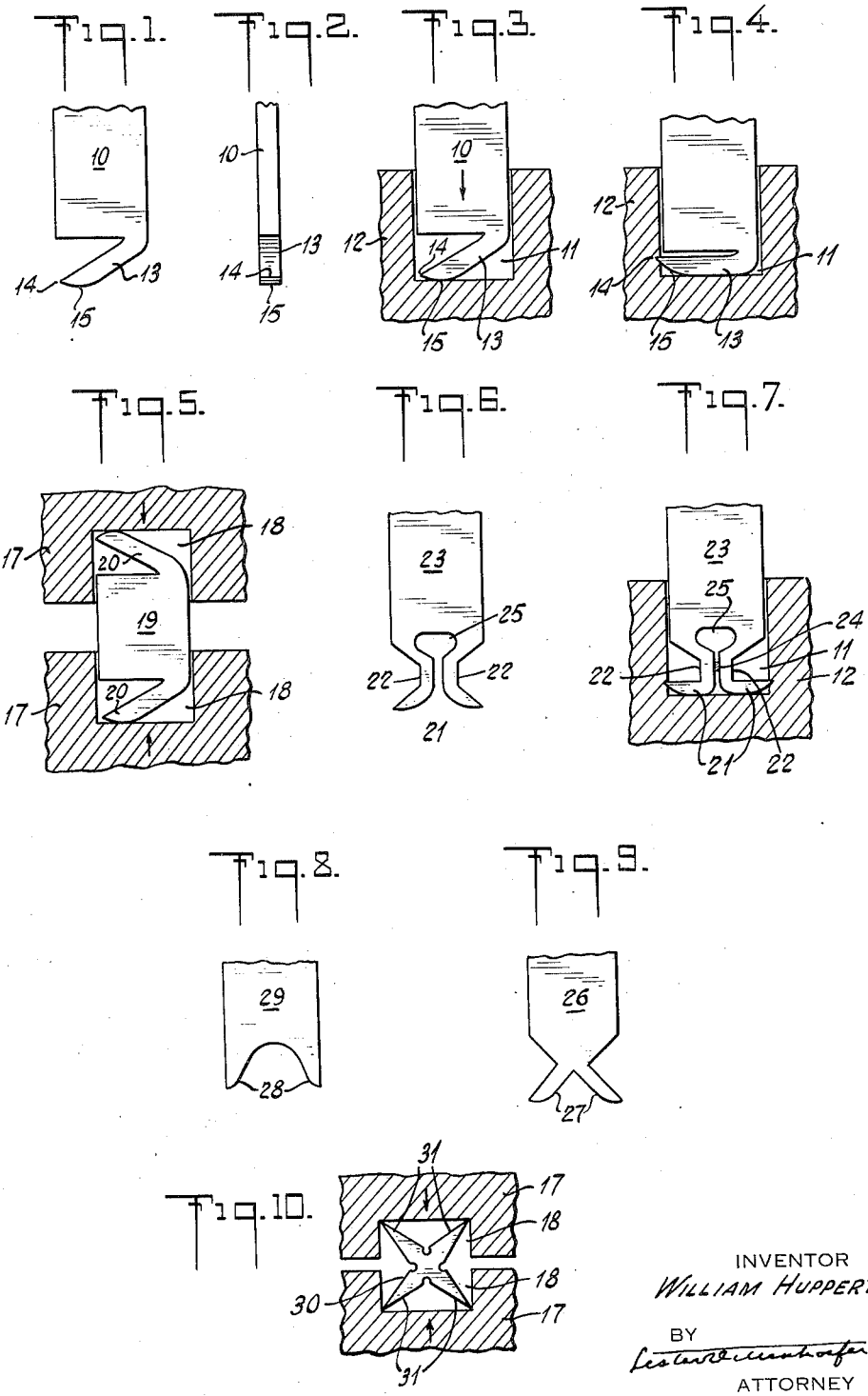
INVENTOR
WILLIAM HUPPERT.
BY
ATTORNEY Patented Jan. 17, 1950

2,495,103

UNITED STATES PATENT OFFICE 2,495,103

ANCHORING DEVICE

William Huppert, New York, N. Y.

Application May 23, 1945, Serial No. 595,451

1 Claim. (Cl. 85—5)

This invention relates to an anchoring device for fastening one part to another or for joining two parts together.

Briefly described, the device comprises a metal body having one or more integral prongs at one or both ends. It is intended to be inserted, without pressure, into a preformed cavity or cavities in the part or parts to which it is to be attached or which are to be joined together. When so inserted, and upon application of pressure, the prong or prongs are bent or spread outwardly to bite into the material surrounding the cavity or cavities so as to secure the device firmly in place.

The device may be used for attachment to, or for joining together, parts made of material that is relatively softer than the metal of which the device is made. It is particularly useful with plastic parts. Considerable difficulty has been experienced in satisfactorily attaching a metal part or insert to a part made of molded plastic such as Bakelite, Tenite, Catalin, etc., or in connecting together two or more parts made of such plastic. The present invention provides an efficient means for accomplishing these, as well as other, purposes.

While the device may be employed in various fields, it is especially useful in the electrical art for attaching metal parts or inserts to molded plastic bodies, such for example, as attaching blades to plastic bodies of electric plugs, or for connecting together in assembled relation parts of electric connectors, outlets, and other electrical articles or appliances. The anchoring device proper, with which this invention is concerned, may itself constitute a portion of the metal part to be attached to a plastic body. For instance, in the case of an electrical plug blade the anchoring device may be an integral portion of the blade construction. Furthermore, the device may be formed to serve the secondary function of securing a wire, cord or other electrical conductor in place and providing effective contact therewith.

The principal object of the invention is to provide a simple and inexpensive device for easily, rapidly and securely attaching an insert to a part or for connecting a plurality of parts together.

Another object is to provide anchoring devices that can be stamped from a metal blank without requiring any bending operation to form the prongs.

A still further object is to provide an anchoring device adapted to be freely inserted into a cavity in the part to which it is to be applied and then to be secured therein by bending or spreading the prong or prongs outwardly.

The accompanying drawings illustrate certain embodiments of the invention, in which:

Figure 1 is a face view of one form of the device;

Fig. 2 is a side view thereof;

Fig. 3 is a view showing the device inserted in a cavity of the part to which it is to be attached;

Fig. 4 is a similar view of the device in anchored position;

Fig. 5 shows a modified form positioned in the cavities of two parts to be joined together;

Fig. 6 is a face view of another modified form;

Fig. 7 is a view showing the same in anchored position;

Figs. 8 and 9 are face views of two other modifications; and,

Fig. 10 shows another form of the device applied to two parts to be connected.

In several of the views the upper part of the anchoring device has been broken away since this invention is directed simply to the portion, which may be termed the shank portion, that is to be inserted in the cavity of the part to which it is to be attached. Where the device is to be used to connect two parts, the upper half may be a mere duplication of the lower half. In the case where the anchoring device itself constitutes the attached part, the upper portion, that is the portion above the shank may be of any required form.

The device in the forms illustrated in Figs. 1 to 4 comprises a body or shank portion 10 of such shape, width and thickness as to fit easily, on simple insertion without pressure, into a preformed cavity or aperture 11 in the part 12, of plastic or other material, to which it is to be applied. The lower end of the shank has an integral, bendable, prong 13 extending at an angle to the shank in the plane thereof. The tip or point 14 of the prong does not project beyond the width of the shank, however the length of the prong is such that when the prong is bent into its anchoring position shown in Fig. 4 the point 14 will protrude beyond the width of the shank to bite into the material of the wall of the cavity. The lower surface 15 of the end of prong 13 may be curved or beveled to provide a cam action that facilitates upward and outward bending movement of the prong as the latter is pressed down against the bottom 16 of the cavity by application of pressure longitudinally of the shank.

As heretofore noted, the device is inserted into the cavity or recess without pressure, and the pressure required to bend the prong into anchoring position is applied only after the device has been so inserted. While the shank and cavity are designed to have a relatively close fit, the fit need not be so tight as to necessitate that the shank be driven into the cavity, nor is it required that the tolerance be nearly as close as is the case where an insert is molded in a plastic part.

The anchoring devices may be formed complete by simply stamping them from sheet or strip stock without requiring any bending operation to form the prongs. Accordingly they may be rapidly and inexpensively manufactured in quantity.

Fig. 5 illustrates one example of a device for connecting together two separate parts 17—17 each having a preformed cavity 18. In this case the body or shank 19 has a prong 20 at both its upper and lower ends, which prongs function in the same manner as, and may be similar in construction to, the prong 13 previously described.

The form shown in Figs. 6 and 7 is designed to effect the additional function of clamping a wire, conductor, or other part between the stems of the prongs. This form has two diverging prongs 21 each connected by a stem 22 to the body or shank 23, the two stems being spaced apart in substantially parallel relation. With this form, an object such as an electric wire 24 bared of insulation, may be firmly gripped and clamped between the stems of the prongs in their anchored position, as indicated in Fig. 7. To facilitate lateral movement of the stems into their clamping position, an opening 25 is formed in the lower end of the shank above the stems, and the lower end edges of the shank are preferably inclined as shown.

Fig. 9 represents a form of the device comprising a shank 26 having two diverging prongs 27 at one or both of its ends, which prongs are adapted to be spread and bent outwardly on application of longitudinal pressure.

Fig. 8 is another form having two bendable prongs 28 extending from a shank 29. In this instance the prongs are not initially divergent but they are adapted to be bent outward divergently to bite into the material of the part to which the device is attached on application of longitudinal pressure.

The device of Fig. 10 has a central portion 30 from which four prongs 31 extend divergently. This form, as in the case of that shown in Fig. 5, is intended to connect together two parts 17 each having a preformed cavity 18. The device is inserted in the cavities with points of the prongs in the corners thereof, and then on pressing the two parts 17—17 together the prongs will spread to bite into the material and to join the parts.

Each of the several forms described have the common characteristic that they may be inserted freely into the preformed cavities and secured therein by bending or spreading the prongs outwardly on pressing the device, or the part or parts to which it is to be anchored, relatively toward each other.

It is to be understood that the several examples described are only illustrative and that the invention may be embodied in forms other than those herein specifically shown and described.

What I claim is:

An anchoring device comprising a body having a shank portion, spaced-apart substantially parallel stem portions extending downwardly from the shank, said stems being adapted to be squeezed toward each other to grip an object therebetween when the device is anchored in place, and bendable prongs integral with and extending outwardly and downwardly from said stems, whereby on insertion of said device into anchoring position the prongs are laterally displaced and the stems are squeezed together.

WILLIAM HUPPERT.

REFERENCES CITED

The following references are of record in the file of this patent:

UNITED STATES PATENTS

| Number | Name | Date |
|---|---|---|
| 477,118 | Hieronymus | June 14, 1892 |
| 1,356,781 | Nix | Oct. 26, 1920 |
| 2,034,080 | Bitzenburger | Mar. 17, 1936 |
| 2,037,122 | Despard | Apr. 14, 1936 |
| 2,236,926 | Surface | Apr. 1, 1941 |
| 2,329,471 | King | Sept. 14, 1943 |

FOREIGN PATENTS

| Number | Country | Date |
|---|---|---|
| 19,022 | Great Britain | Aug. 24, 1914 |
| 239,821 | Great Britain | Sept. 17, 1925 |